United States Patent Office 3,356,651
Patented Dec. 5, 1967

3,356,651
VINYLIDENEARYLENEALKYLENE CARBONATES AND POLYMERS THEREOF
Lieng-Huang Lee, Midland, Mich., assignor to The Dow Chemical Company, Midland, Mich., a corporation of Delaware
No Drawing. Filed Mar. 6, 1964, Ser. No. 350,124
11 Claims. (Cl. 260—77.5)

This invention relates to polymerization products and to substances suitable as starting materials in the preparation of such polymerization products. More particularly, it relates to vinylidenearylenealkylene carbonates which may be polymerized alone or with other polymerizable substances to form materials having advantageous properties.

It has now been found that esters prepared from (a) vinylidenearylenemethylene alcohols and (b) aliphatic, aromatic and alicyclic haloformates or the corresponding thio or dithio isologs are useful monomers for the preparation of polymeric materials having desirable properties, e.g., the polymeric materials are moldable, can be formed into transparent self-supporting films, and are compatible with hydrocarbon polymers.

The invention includes the compounds having the formula

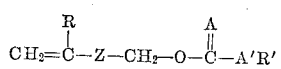

wherein R is a radical selected from hydrogen and methyl, Z is an arylene, A and A' are selected individually from oxygen and sulfur, R' is a radical selected from the group consisting of lower alkyls (alkyls having from 1 to 4 carbon atoms such as ethyl, methyl, propyl, isopropyl, n-butyl and isobutyl) and hydrocarbon radicals having from 5 to 20 carbon atoms, e.g. an alkyl, aryl aralkyl, or alicyclic radical. The invention also includes homopolymers of the vinylidenearylenemethylene carbonates described herein, as well as interpolymers of the vinylidenearylenemethylene carbonates with at least one other polymerizable ethylenically unsaturated compound.

The vinylidenearylenemethylene carbonates are conveniently prepared by reacting a vinylidenearylenemethylene alcohol with an isologous haloformate as by mixing the alcohol and the isologous haloformate and maintaining the mixture at a temperature between about —10° C. and 25° C., preferably between about —5° C. and 5° C. until substantially maximum conversion is achieved; normally about 5 hours is sufficient and often about 2 hours or less is ample. An acid acceptor, such as pyridine or sodium hydroxide, may be used if desired. Often a polymerization inhibitor is added to the reaction mixture to prevent premature polymerization.

Although it is recognized that virtually any proportion of reactants will effect formation of some of the desired product, approximately equimolar amounts of the reactants are preferred, e.g. from 1 to 1.2 moles of the herein described alcohol per mole of the haloformate.

The vinylidenearylenemethylene alcohols required for the preparation of the products of this invention may be obtained, for example, by the method described in United States Letters Patent 3,055,947. Representative of such alcohols are vinylbenzyl alcohol, i.e., o-vinylbenzyl alcohal, m-vinylbenzyl alcohol, p-vinylbenzyl alcohol, and mixtures of such isomers; vinylnaphthylmethyl alcohol, vinylanthrylmethyl alcohol, vinylbiphenylmethyl alcohol, isopropenylbenzyl alcohol, isopropenylnaphthylmethyl alcohol, isopropenylanthrylmethyl alcohol, and isopropenylbiphenylmethyl alcohol.

The isologous haloformate used in the practice of this invention corresponds to the general formula

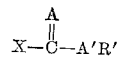

wherein X is a halogen, preferably chlorine, bromine or iodine, A, A' and R' are as defined above. An especially advantageous group of haloformates are the lower alkyl chloroformates, such as methyl chloroformate, ethyl chloroformate, n-propyl chloroformate, isopropyl chloroformate and n-butyl chloroformate. However, numerous other isologous haloformates may be used such as methyl bromoformate, ethyl thiochloroformate, ethyl dithiochloroformate, dodecyl chloroformate, ethyl iodoformate, phenyl thiochloroformate, phenyl bromoformate, anthryl chloroformate, eicosyl chloroformate, and the like.

The vinylidenearylenealkylene carbonates of the present invention are light-colored to colorless liquids which easily form polymeric materials by readily undergoing polymerization or copolymerization with various other monomeric, polymerizable ethylenically unsaturated compounds, exemplary of which are olefinic hydrocarbons such as ethylene, propylene, butene-1, styrene, 1,3-butadiene, isoprene and the like; vinyl esters such as vinyl acetate; acrylates and methacrylates, e.g., ethyl acrylate, methyl methacrylate; α,β-ethylenically unsaturated carboxylic acids, such as acrylic acid, methacrylic acid, maleic acid and fumaric acid; alkenyl ketones such as vinyl methyl ketone and isopropenyl methyl ketone; vinylidene compounds such as vinyl chloride, vinylidene chloride, acrylonitrile and methacrylonitrile; and mixtures thereof. Such polymerization may be accomplished in bulk, in solution or in emulsion by thermal activation or by catalysts from free-radical producing means such as peroxygen-type catalysts or other free-radical producing materials such as the azo catalysts or other well known in the art, or by the action of ionic catalysts, all at catalytically effective concentrations.

Examples of the peroxygen-type catalysts are diethyl peroxide, hydrogen peroxide; di-tertiary butyl peroxide; persuccinic acid; lauroyl peroxide; tetrahydronaphthalene peroxide; alkali metal, alkaline earth metal or ammonium persulfates, perborates, percarbonates; and the like. Such catalysts usually are used in the range from about 0.01 percent to about 1 percent, based on the weight of the monomers. Other methods of catalysts—such as irradiation by ultraviolet, X-ray and gamma rays as well as by radiation from radioactive materials and high energy electrons generated from linear accelerators, resonant transformers, and the like—may be used if desired. The term "under the influence of free-radical producing means" is defined to include free-radical producing materials as defined above in contact (e.g., either as solid particles or in solution) with the polymerizable monomer mixture and to irradiation as herein described, which produce free-radicals in effective concentration within the polymerization zone. The ionic catalysts include, but are not limited to, such compounds as aluminum chloride, boron trifluoride, stannic chloride and titanium tetrachloride. Low temperature procedures, such as from 0–100° C. may be used with such catalysts.

To illustrate more fully the practice of this invention to those skilled in the art, the following examples are given, without any limitation in scope being intended thereby. In the examples, all parts and percentages are by weight unless otherwise noted.

Example 1

A solution in pyridine of 27 grams (0.25 mole) of vinylbenzyl alcohol was prepared and placed in a 250-ml., 3-necked, round-bottomed flask equipped with a condenser, a stirrer and a dropping funnel. A salt-ice bath was used to cool the solution in the reactor to below 10° C., then 23 grams (0.25 mole) of methyl chloroformate was added slowly, with stirring, over a period of about one hour. The resulting mixture was stirred for an additional hour, then was washed with water to remove pyridine hydrochloride formed during the reaction. After the washed organic layer was dried over anhydrous sodium sulfate, the dry liquid obtained thereby was distilled under reduced pressure (0.7 mm. of mercury) in the presence of a small amount of a polymerization inhibitor, 2-cyclohexyl-4,6-dinitrophenol. By this procedure, vinylbenzyl methyl carbonate was obtained in 69 percent yield having a boiling point of 108–110° C. at a pressure of 7 mm. of mercury, index of refraction $N_D^{25}$, 1.5287; specific gravity: $d_4^{25}$, 1.0955.

*Analysis.*—Calculated: C, 68.7%; H, 9.09%. Found, C, 68.7%; H, 6.24%.

Example 2

A portion of the vinylbenzyl methyl carbonate (10 grams) prepared in Example 1 was mixed with 0.1 gram of benzoyl peroxide, then heating at 60° C. caused polymerization to occur. The polymer product obtained thereby was colorless and possessed good stability at elevated temperature. Compression molded films of about 2 mil thickness were prepared at 420° F. There was no discoloration or yellowing of the polymeric compositions because of deterioration of the polymerized vinylbenzyl methyl carbonate during the molding operations.

Example 3

Vinylbenzyl ethyl carbonate was prepared by the procedure of Example 1 from vinylbenzyl alcohol and ethyl chloroformate and was polymerized without isolation of the monomer. The polymeric product had characteristics similar to the product of Example 2.

By the procedure of Example 1, other vinylidenearylenemethylene carbonates are prepared from other vinylidenearylenemethyl alcohols such as isopropenylbenzyl alcohol, vinylnaphthylmethyl alcohol, vinylanthrylmethyl alcohol, vinylbiphenylylmethyl alcohol and from other isologous haloformates such as propyl chloroformate, butyl chloroformate, ethyl bromoformate, methyl iodoformate, ethyl chlorothioformate, diethyl chlorodithioformate, anthryl chloroformate and eicosyl chloroformate. Such vinylidenearylenemethylene carbonates are polymerized by the procedure of Example 2 to form similar polymeric products having similar advantageous properties.

What is claimed is:

1. A compound having the general formula

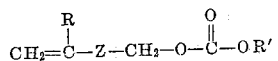

wherein R is a radical selected from the group consisting of hydrogen and methyl, Z is an arylene, and R' is a radical selected from the group consisting of lower alkyls and hydrocarbon radicals having from 5 to 20 carbon atoms.

2. The compound of claim 1 in which R is hydrogen.
3. The compound of claim 1 in which Z is phenylene.
4. The compound of claim 1 in which R' is lower alkyl.
5. The compound of claim 1 in which R is hydrogen, and R' is lower alkyl.
6. The compound of claim 1 in which R' is methyl.
7. The compound of claim 1 in which R' is ethyl.
8. A polymer of a monomer having the general formula

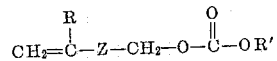

wherein R is a radical selected from the group consisting of hydrogen and methyl, Z is an arylene, R' is a radical selected from the group consisting of lower alkyls, and hydrocarbon radicals having from 5 to 20 carbon atoms.

9. The polymer of claim 8 in which Z is phenylene.
10. The polymer of claim 8 in which R is hydrogen and R' is methyl.
11. A copolymer of a monoethylenically unsaturated polymerizable monomer and a lower alkyl vinylbenzyl carbonate.

References Cited

UNITED STATES PATENTS 2,595,214   5/1952   Adelson et al. _____ 260—77.5
3,150,119   9/1964   Hoffenberg et al. ____ 260—79.7

SAMUEL H. BLECH, *Primary Examiner.*